United States Patent
O'Neil et al.

(10) Patent No.: US 10,348,599 B2
(45) Date of Patent: Jul. 9, 2019

(54) AUTOMATED LOAD BALANCER DISCOVERY

(71) Applicant: Edgewise Networks, Inc., Burlington, MA (US)

(72) Inventors: John O'Neil, Watertown, MA (US); Thomas Evan Keiser, Jr., Boston, MA (US); Peter Smith, Acton, MA (US)

(73) Assignee: Edgewise Networks, Inc., Burlington, MA (US)

( * ) Notice: Subject to any disclaimer, the term of this patent is extended or adjusted under 35 U.S.C. 154(b) by 0 days.

(21) Appl. No.: 16/185,295

(22) Filed: Nov. 9, 2018

(65) Prior Publication Data
US 2019/0149444 A1 May 16, 2019

Related U.S. Application Data

(60) Provisional application No. 62/584,456, filed on Nov. 10, 2017.

(51) Int. Cl.
*G06F 15/173* (2006.01)
*H04L 12/26* (2006.01)
*H04L 29/08* (2006.01)
*H04L 12/24* (2006.01)

(52) U.S. Cl.
CPC .......... *H04L 43/106* (2013.01); *H04L 41/046* (2013.01); *H04L 41/0893* (2013.01); *H04L 43/0876* (2013.01); *H04L 67/1004* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS

| | | |
|---|---|---|
| 4,941,089 A | 7/1990 | Fischer |
| 5,577,209 A | 11/1996 | Boyle |
| 6,453,419 B1 | 9/2002 | Flint |
| 6,950,947 B1 | 9/2005 | Purtell |
| 7,318,105 B1 | 1/2008 | Bongiovanni |
| 7,546,629 B2 | 6/2009 | Albert |

(Continued)

FOREIGN PATENT DOCUMENTS

| | | |
|---|---|---|
| EP | 2795556 | 10/2014 |
| IN | 201617036751 | 10/2016 |

(Continued)

OTHER PUBLICATIONS

International Search Report and Written Opinion dated Feb. 15, 2019, by the International Search Authority in International Patent Application No. PCT/US2018/059924, 10 pages.

(Continued)

*Primary Examiner* — Quang N Nguyen
(74) *Attorney, Agent, or Firm* — Blueshift IP, LLC; Robert Plotkin

(57) ABSTRACT

Computer-implemented systems and methods automatically identify computers that act as load balancers on a digital communications network, using data collected from one or more computers on that network. Once a load balancer has been identified, the communications between two hosts may be connected across the identified load balancer, thereby making it possible to better analyze the behavior of hosts and applications on that network.

6 Claims, 4 Drawing Sheets

(56) References Cited

U.S. PATENT DOCUMENTS

| | | |
|---|---|---|
| 7,890,612 B2 | 2/2011 | Todd |
| 8,370,509 B2 | 2/2013 | Faynberg |
| 8,392,972 B2 | 3/2013 | Manring |
| 8,499,348 B1 | 7/2013 | Rubin |
| 9,003,484 B2 | 4/2015 | May |
| 9,349,103 B2 | 5/2016 | Eberhardt, III |
| 9,419,949 B2 | 8/2016 | Sharma |
| 9,436,820 B1 | 9/2016 | Gleichauf |
| 9,503,470 B2 | 11/2016 | Gertner |
| 9,525,696 B2 | 12/2016 | Kapoor |
| 9,773,107 B2 | 9/2017 | White |
| 10,104,643 B2 * | 10/2018 | Tsai .................. H04W 72/02 |
| 10,154,067 B2 | 12/2018 | Smith |
| 2003/0051026 A1 | 3/2003 | Carter |
| 2003/0149895 A1 | 8/2003 | Choo |
| 2004/0252694 A1 | 12/2004 | Adhikari |
| 2007/0118655 A1 | 5/2007 | Tsumura |
| 2007/0150933 A1 | 6/2007 | Dougherty |
| 2008/0034418 A1 | 2/2008 | Venkatraman |
| 2009/0100261 A1 | 4/2009 | Aoshima |
| 2009/0106842 A1 | 4/2009 | Durie |
| 2010/0011433 A1 | 1/2010 | Harrison |
| 2011/0252462 A1 | 10/2011 | Bonanno |
| 2012/0023230 A1 | 1/2012 | Hosking |
| 2012/0311654 A1 | 12/2012 | Dougherty, III |
| 2013/0191517 A1 | 7/2013 | Ling |
| 2013/0246606 A1 | 9/2013 | Branch |
| 2014/0108558 A1 | 4/2014 | Borzycki |
| 2015/0326486 A1 | 11/2015 | Zawadowskiy |
| 2016/0078365 A1 | 3/2016 | Baumard |
| 2016/0080236 A1 | 3/2016 | Nikolaev |
| 2016/0323318 A1 | 11/2016 | Terrill |
| 2016/0330222 A1 | 11/2016 | Brandt |
| 2016/0352683 A1 | 12/2016 | Cooper |
| 2016/0352766 A1 | 12/2016 | Flacher |
| 2017/0033995 A1 * | 2/2017 | Banka ................. H04L 41/0866 |
| 2017/0063798 A1 | 3/2017 | Lapidous |
| 2017/0063896 A1 | 3/2017 | Muddu |
| 2017/0118249 A1 | 4/2017 | Motukuru |
| 2017/0330107 A1 * | 11/2017 | Gonzalez Sanchez ..................... H04L 41/16 |
| 2018/0234385 A1 | 8/2018 | O'Neil |
| 2018/0234460 A1 | 8/2018 | Smith |
| 2018/0248851 A1 * | 8/2018 | Kaplan Haelion ......................... H04L 63/0428 |
| 2019/0068474 A1 | 2/2019 | Vasseur |

FOREIGN PATENT DOCUMENTS

| | | |
|---|---|---|
| KR | 100615080 | 8/2006 |
| KR | 20090006632 A | 1/2009 |
| WO | 2008095010 A1 | 8/2008 |
| WO | 2018148058 A1 | 8/2018 |
| WO | 2018152303 | 8/2018 |

OTHER PUBLICATIONS

Adyisory Action dated Dec. 14, 2018 in U.S. Appl. No. 15/899,453 of John O'Neil, filed Feb. 20, 2018, 3 pages.

Notice of allowance dated May 8, 2019 in U.S. Appl. No. 15/899,453 of John O'Neil, filed Feb. 20, 2018, 19 pages.

* cited by examiner

AUTOMATED LOAD BALANCER DISCOVERY

CROSS-REFERENCE TO RELATED APPLICATIONS

This application is related to U.S. patent application Ser. No. 15/883,534, entitled, "Network Application Security Policy Enforcement," filed on Jan. 30, 2018, which is hereby incorporated by reference herein.

BACKGROUND

Applications connected by network infrastructure communicate with each other in order to share data and perform business operations. Computers known as "load balancers" often are used to balance the load of network communications between computers. In general, a load balancer is a computer that sits between machines which use a service and the servers that supply that service, and which balances the workload among such servers in order to avoid overloading any one server and thereby to improve network performance.

Networked systems such as those described in the above-referenced Pat. App. Ser. No. 62/457,508 may include many computers that act as load balancers. Although it would be useful for a variety of purposes to know which computers in the system are load balancers, the identity of such load balancers is not typically known a priori to other computers on the network.

SUMMARY

Computer-implemented systems and methods automatically identify computers that act as load balancers on a digital communications network, using data collected from one or more computers on that network. Once a load balancer has been identified, the communications between two hosts may be connected across the identified load balancer, thereby making it possible to better analyze the behavior of hosts and applications on that network.

Other features and advantages of various aspects and embodiments of the present invention will become apparent from the following description and from the claims.

DETAILED DESCRIPTION

Embodiments of the present invention include computer-implemented systems and methods for automatically identifying load balancers on a digital communications network, using data collected from one or more computers on that network. Once a load balancer has been identified, the communications between two hosts may be connected across the identified load balancer, thereby making it possible to better analyze the behavior of hosts and applications on that network.

Figure 1:
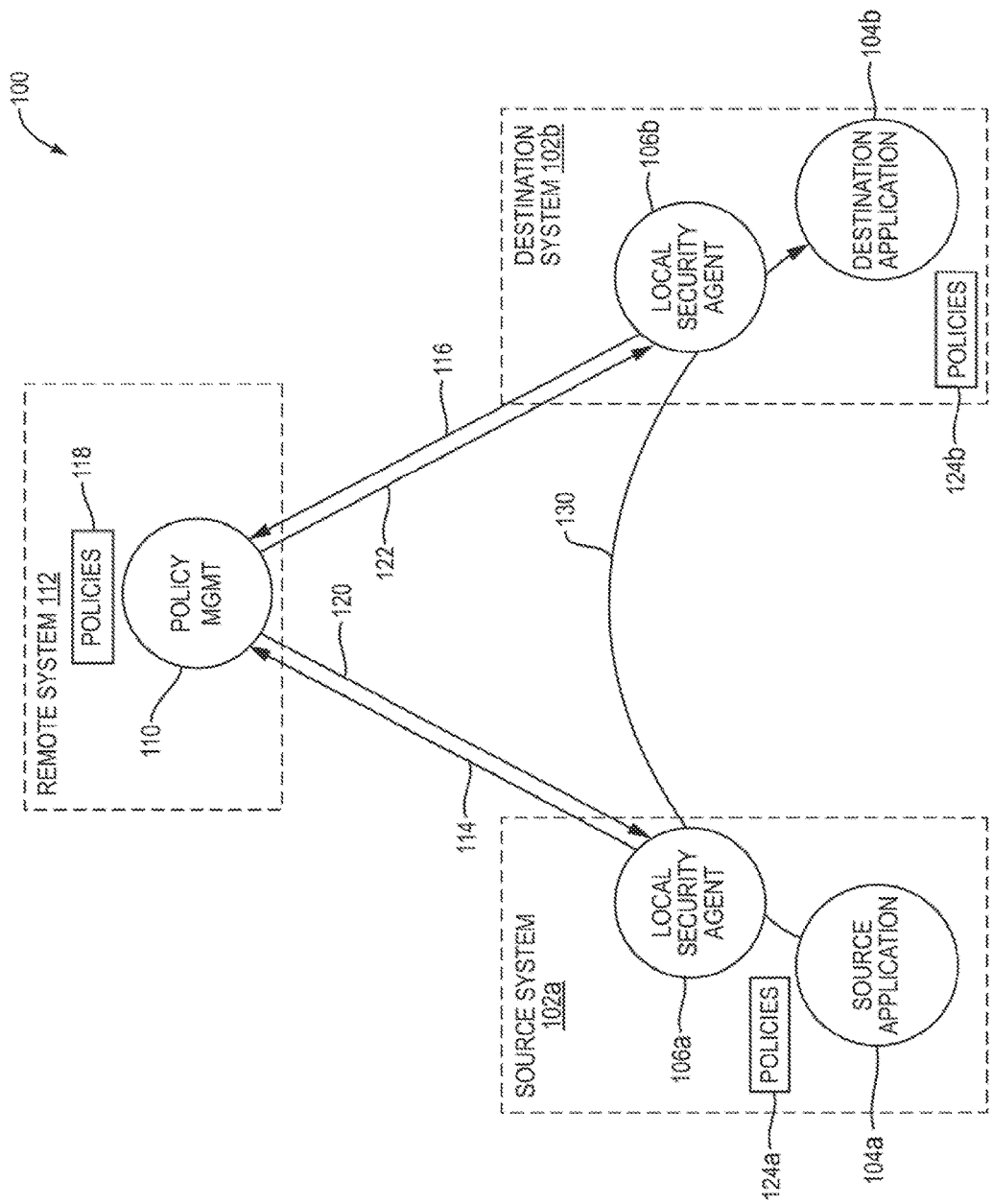
FIG. 1 is a dataflow diagram of a system for collecting communication information from a network according to one embodiment of the present invention.

Referring to FIG. 1, a dataflow diagram is shown of a system 100 for collecting communication information from a network according to one embodiment of the present invention.

The system 100 includes a source system 102a and a destination system 102b. A "system," as that term is used herein (e.g., the source system 102a and/or destination system 102b), may be any device and/or software operating environment that is addressable over an Internet Protocol (IP) network. For example, each of the source system 102a and the destination system 102b may be any type of physical or virtual computing device, such as a server computer, virtual machine, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 1 merely to illustrate a use case in which the source system 102a initiates communication with the destination system 102b. In practice, the source system 102a may initiate one communication with the destination system 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems, and may act as either the source or destination in those communications. Furthermore, the system 100 may include additional systems, all of which may perform any of the functions disclosed herein in connection with the source system 102a and the destination system 102b.

The source system 102a includes a source application 104a (which may, for example, be installed and executing on the source system 102a) and the destination system 102b includes a destination application 104b (which may, for example, be installed and executing on the destination system 102b). Each of these applications 104a and 104b may be any kind of application, as that term is used herein. The source application 104a and the destination application 104b may have the same or different characteristics. For example, the source application 104a and destination application 104b may both be the same type of application or even be instances of the same application. As another example, the source application 104a may be a client application and the destination application 104b may be a server application, or vice versa.

The source system 102a includes a local security agent 106a and the destination system 102b includes a local security agent 106b. More generally, a local security agent may be contained within (e.g., installed and executing on) any system that executes one or more applications to which the security techniques disclosed herein are to be applied. A local security agent may, for example, execute within the same operating system on the same system as the application(s) that the local security agent monitors. Each such local security agent (e.g., the local security agents 106a and 106b) may include any combination of hardware and/or software for performing the functions disclosed herein.

The system 100 also includes a policy management engine 110. The policy management engine may include any combination of hardware and/or software for performing the functions disclosed herein. In the particular embodiment illustrated in FIG. 1, the policy management engine 110 is contained within (e.g., installed and executing on) a remote system 112. The remote system 112 may be any device and/or software application that is addressable over an IP network. For example, the remote system 112 may be any type of computing device, such as a server computer, virtual machine, desktop computer, laptop computer, tablet computer, smartphone, or wearable computer. The remote system 112 and the source and destination systems 102a-b may have the same or different characteristics. For example, the source and destination systems 102a-b may be smartphones and the remote system 112 may be a server computer.

Some or all of the local security agents 106a-b may report the state of the local applications as well as the state of the network on their system to the policy management engine 110. For example, in FIG. 1, the local security agent 106a is on the same system as and monitors the source application 104a. The local security agent 106a may, therefore, obtain state information about the source application 104a and report some or all of that state information, and/or information derived therefrom, to the policy management engine 110. Although in the example of FIG. 1 only one source application 104a is shown on the source system 102a, any number of source applications may execute on the source system 102a, and the local security agent 106a may obtain and report state information for some or all of such source applications to the policy management engine 110. The local security agent 106a may also report information about the network configuration on source system 102a that will help the policy management engine 110 identify system 102a to other systems independent of the applications that may be executing. The local security agent 106a may also report information about the system network topology of the source system 102a, such as its IP addresses and/or Address Resolution Protocol (ARP) cache. All such reporting is represented by communication 114 in FIG. 1. Such communication 114 may be implemented in any of a variety of ways, such as by the local security agent 106a transmitting (e.g., via IP and/or another network communication protocol) one or more messages containing the obtained application state and network configuration information to the policy management engine 110.

Similarly, the local security agent 106b on the destination system 102b may obtain and transmit state information for the destination application 104b (and for any other applications executing on the destination system 102b) and for the network configuration information of destination system 102b and transmit such information via communication 116 to the policy management engine 110 in any of the ways disclosed above in connection with the local security agent 106a, the source system 102a, the source application 104a, and the communication 114.

The policy management engine 110 may receive the transmitted state information from communications 114 and 116 and store some or all of it in any suitable form. As described above, such state information may include both application state information and network topology information (e.g., addresses, listening ports, broadcast zones). The policy management engine 110 may, for example, store such state information from communications 114 and 116 in a log (e.g., database) of state information received from one or more local security agents (e.g., local security agents 106a-b) over time. Such a log may include, for each unit of state information received, an identifier of the system (e.g., source system 102a or destination system 102b) from which the state information was received. In this way, the policy management engine 110 may build and maintain a record of application state and network configuration information from various systems over time.

Figure 2:
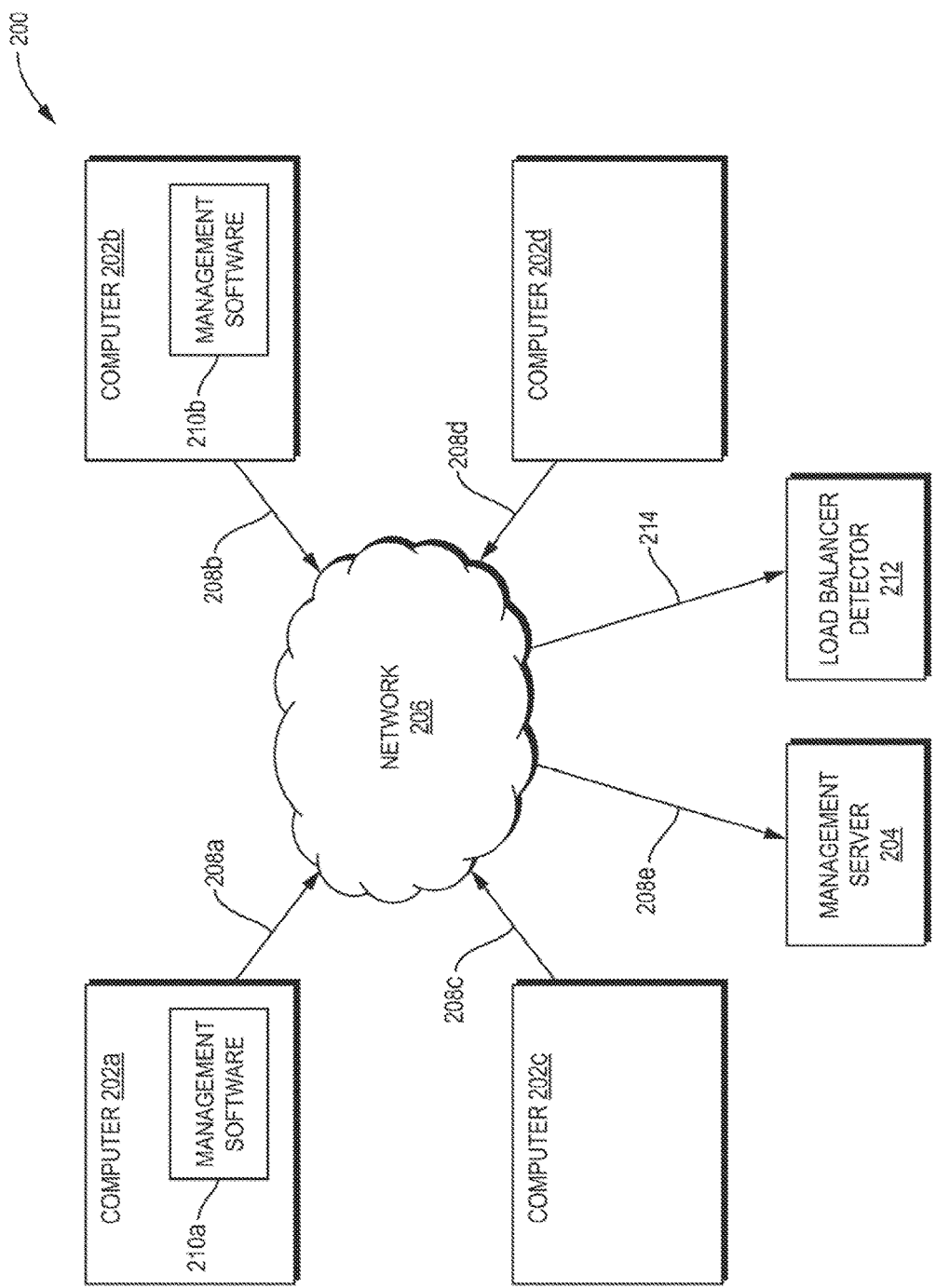
FIG. 2 is a dataflow diagram of a system for automatically identifying load balancers in a network according to one embodiment of the present invention.
Figure 3:
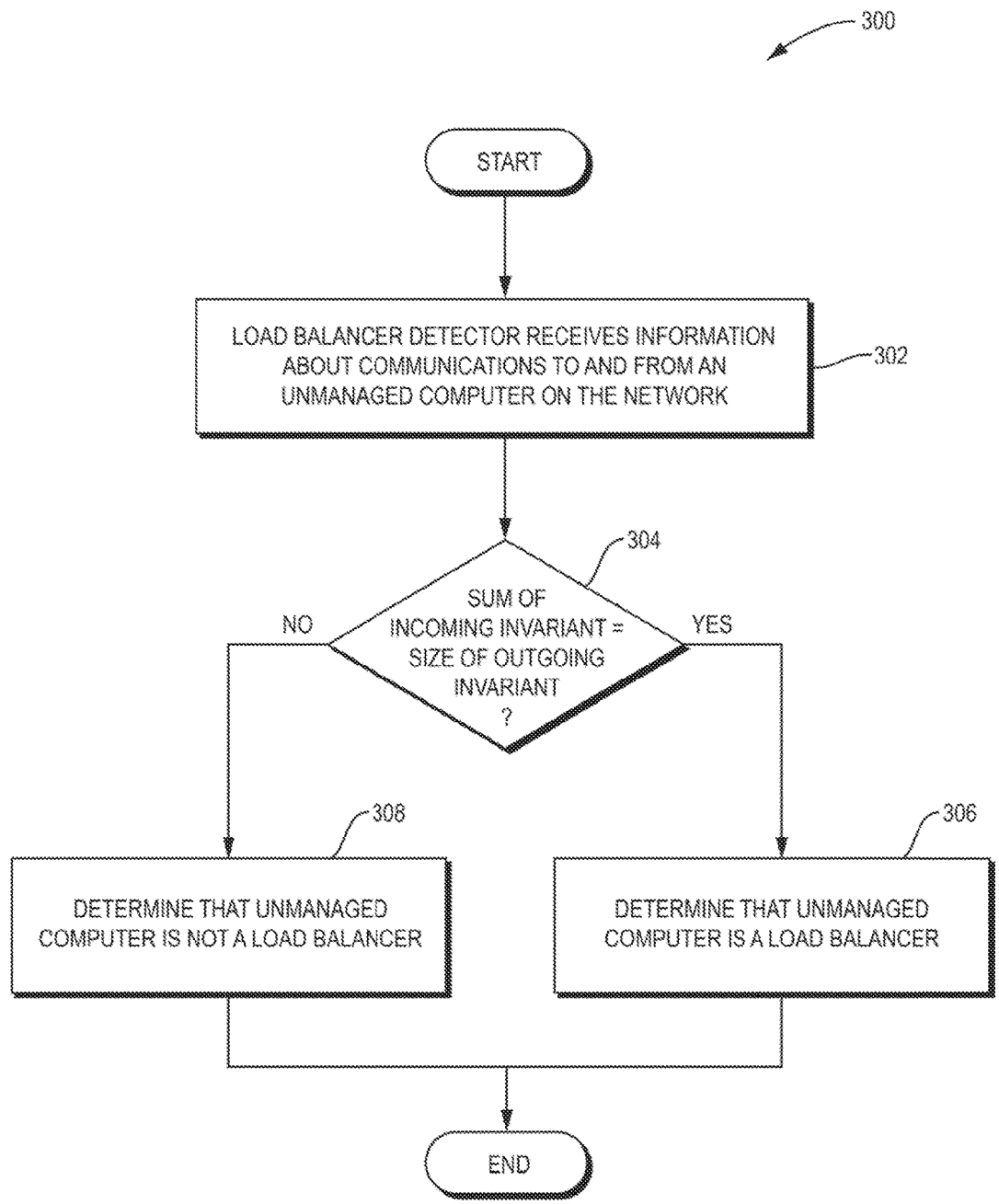
FIG. 3 is a method performed by the system of FIG. 2 according to one embodiment of the present invention.

Referring to FIG. 2, a dataflow diagram is shown of a system 200 for automatically identifying load balancers on a network according to one embodiment of the present invention. Referring to FIG. 3, a flowchart is shown of a method 300 performed by the system 200 of FIG. 2 according to one embodiment of the present invention.

The system 200 includes a plurality of computers 202a-d. Although four computers 202a-d are shown in FIG. 2, the system 200 may include any number of computers. The system 200 also includes a management server 204 which, as described in more detail below, performs various management functions in connection with some of the computers 202a-d. In FIG. 1 herein, and in the above-referenced Pat. App. Ser. No. 62/457,508, the remote system 112 is an example of the management server 204 in FIG. 2 herein. As this implies, the management server 204 in FIG. 2 herein may include the policy management engine 110 of FIG. 1.

The system 200 also includes a network 206, which may be any digital communications network (or combination of such networks), such as a private intranet or the public Internet. The computers 202a-d communicate with each other, and with the management server 204, in any of a variety of ways over the network 206. Communications 208a-e in FIG. 2 represent such communications.

Some of the computers 202a-d may contain management software. In the particular example of FIG. 2, computer 202a contains management software 210a and computer 202b contains management software 210b. The particular computers that are shown as containing management software in FIG. 2 are merely an example. Any one or more of the computers 202a-d in the network 206 may contain management software. Any computer in the network 206 which contains management software is referred to herein as a "managed computer." Any computer in the network which does not contain management software (such as computers 202c and 202d in the example of FIG. 2) is referred to herein as an "unmanaged computer."

As described in more detail below, managed computers in the network (e.g., computers 202a and 202b) use their management software (e.g., management software 210a and 210b, respectively) to inform the management server 204 about which applications on those computers are in communication with other computers on the network 206. Examples of how managed computers may perform this function in cooperation with the management server 204 are described in more detail in Pat. App. Ser. No. 62/457,508. For example, managed computers in the system 200 of FIG. 2 may include local security agents of the kind shown in the system 100 of FIG. 1. As a particular example, computer 202a in FIG. 2 may be implemented in the same manner as the source system 102a of FIG. 1, and therefore may contain local security agent 106a. Similarly, computer 202b in FIG. 2 may be implemented in the same manner as the destination system 102b of FIG. 2, and therefore may contain local security agent 106b. As a result, any description herein of systems 102a-b in FIG. 1 applies equally to the computers 202a-b in FIG. 2.

The system 200 may distinguish between communications 208a-e among computers in the network 206 (e.g., computers 202a-d and management server 204) and communications (not shown) which leave the network 206, using techniques that are well-known to those having ordinary skill in the art. The latter communications are not described herein.

As will now be described, the system 200 and method 300 may automatically discover load balancers in the system 200, i.e., determine which of the computers 202a-d in the system 200 is a load balancer. Typically, although not necessarily, a load balancer has load balancer software installed on it and few or no other applications installed on it, so that the load balancer can devote its resources primarily to performing the function of load balancing. In some cases a load balancer may be prohibited from having software other than load balancer software installed on it.

The system 200 includes a load balancer detector 212, which may be a "system," as that term is used herein. A "system," as that term is used herein, may be any device and/or software operating environment that is addressable over an Internet Protocol (IP) network. For example, a system may be any type of physical or virtual computing device, such as a server computer, virtual machine, desktop computer, laptop computer, tablet computer, smartphone, or wearable computer. Any two systems may have the same or different characteristics as each other. For example, one system may be a smartphone and another system may be a server computer. A system may include one or more other systems, and/or be included within another system. As merely one example, a system may include one or more virtual machines. In FIG. 2, each of the computers 202a-d, management server 204, and load balancer detector 212 may be a system.

Although the management server 204 and the load balancer detector 212 are shown as separate elements in FIG. 2 for ease of illustration, the management server 204 and the load balancer detector 212 may be combined together in any of a variety of ways. For example, a single system (as that term is defined herein) may implement both the management server 204 and the load balancer detector 212, in which case the management server 204 may communicate with the load balancer detector 212 using intra-system communications, rather than communications over the network 206.

Without loss of generality, assume that the load balancer detector 212 receives messages, over the network 206, which may, for example, be messages sent from managed computers 202a-b or messages containing information about messages sent from managed computers 202a-b, in the following format: {in/out, managedHost, unmanagedHost, size, timestamp}. In this tuple:

"in/out" indicates whether the system indicated by "managedHost" is the source or the destination of the message;

"unmanagedHost" is the system that is on the other side of the connection, i.e., on the destination side if the system indicated by "managedHost" is on the source side, and on the source side of the system indicated by "managedHost" is on the destination side, where the system indicated by "managedHost" is a managed computer as that term is used herein;

"timestamp" indicates the time of the message; and

"size" indicates a scalar invariant related to the message, such as the size (e.g., in bytes) of the message payload, the number of separate communication exchanges between the hosts, or some other quantity. The "size" element is an unchangeable property of the message, and therefore must be conserved on either side of the load balancer (that is, the total of sizes going in one side of the load balancer must equal the total of sizes going out the other side). This is true in both directions, i.e., if the load balancer has sides A and B, then the total of sizes going into side A must be equal to the total of sizes coming out of side B, and the total of sizes going into side B must be equal to the total of sizes coming out of side A. Another example of size is any information that is injected into the message (e.g., by the source host's agent) that can be detected by the destination host's agent. Yet another example of size is the total number of bytes in a flow that passes through the load balancer, the total number of packets in a flow that passes through the load balancer, or to the total number of flows that pass through the load balancer. As described in more detail below, the load balancer detector 212 makes use of the invariability of the "size" element.

Note that the network communications that are evaluated by the load balancer detector 212 to automatically identify load balancers will always be between managed and unmanaged hosts. The reason is that if both hosts that are party to a connection are managed, then the connection does not involve a load balancer and the connection need not be taken into account by the load balancer detector 212, even if they are received by the load balancer detector. On the other hand, if both hosts that are party to a connection are unmanaged, then the messages transmitted between those hosts within the connection are not seen by the load balancer detector 212.

As will now be described in more detail, the method 300 of FIG. 3 uses the fact that the size (as that term is described above) of each inbound flow to the load balancer must be balanced by an outbound flow of the same size, at approximately the same time, to automatically identify load balancers in the system 200.

In general, communications 214 are communications between the load balancer detector 212 and other computers on the network 206. For example, the communications 214 may include: (1) communications sent from and/or to managed computers (e.g., computers 202a and 202b), such communications intercepted from and/or to such computers; and (2) communications sent from the management server 204 to the load balancer detector 212, representing communications received from and/or sent to managed computers (e.g., computers 202a and 202b) in the network 206. The management server 204 may, for example, use any of the techniques disclosed in Pat. App. Ser. No. 62/457,508 and in connection with FIG. 1 herein to collect information about communications received from and/or sent to managed computers in the network 206, and then provide information about such communications (such as any one or more of the {in/out, managedHost, unmanagedHost, size, timestamp} elements described above) to the load balancer detector 212. Any description herein of information about network communications that is used by the load balancer detector 212 may include such information received by the load balancer detector 212 from the management server 204.

If all of the systems that connect to a particular (unmanaged) load balancer in the network 206 are managed computers, then the management server 204 will receive information about all communications received and sent by the load balancer, and the load balancer detector 212 will receive information about all such communications. In this case, the load balancer detector 212 may identify such a load balancer as follows. As the load balancer detector 212 receives information about communications to and from a particular unmanaged computer on the network 206 (FIG. 3, operation 302), the load balancer detector 212 may determines whether the sum of the incoming size to the unmanaged computer on the network 206 is equal to the sum of the outgoing size from that unmanaged computer (FIG. 3, operation 304). If the sum of the incoming size is determined to be equal to the sum of the outgoing size, then the load balancer detector 212 may conclude that the unmanaged computer is a load balancer (FIG. 3, operation 306). Otherwise, the load balancer detector 212 may conclude that the unmanaged computer is not a load balancer (FIG. 3, operation 308).

The process just described is most accurate when applied to a sufficiently large quantity of communications to and from the unmanaged computer over a sufficiently large amount of time. The same process may, however, be applied to a smaller quantity of communications over a shorter amount of time, although the determination made by such a process (in operation 304 of FIG. 3) will be less accurate for shorter periods of time than for longer periods of time, because the timestamp associated with each data report tuple is from a particular system, and systems may differ in their reporting of the same time, resulting in skewing of the size balance.

A more serious complication is that not every system which sends and/or receives flows from a load balancer is a managed computer (i.e., not every such system has an agent, such as agents 210a and 210b, installed on it). Therefore, when a communication between a managed computer and an unmanaged computer passes through a load balancer, the management server 204 (and therefore the load balancer detector 212) only receives information about the managed half of that communication. As a result, the inbound size of the communication that is detected by the load balancer detector 212 will differ from the outbound size of the same communication as detected by the load balancer detector 212.

Figure 4:
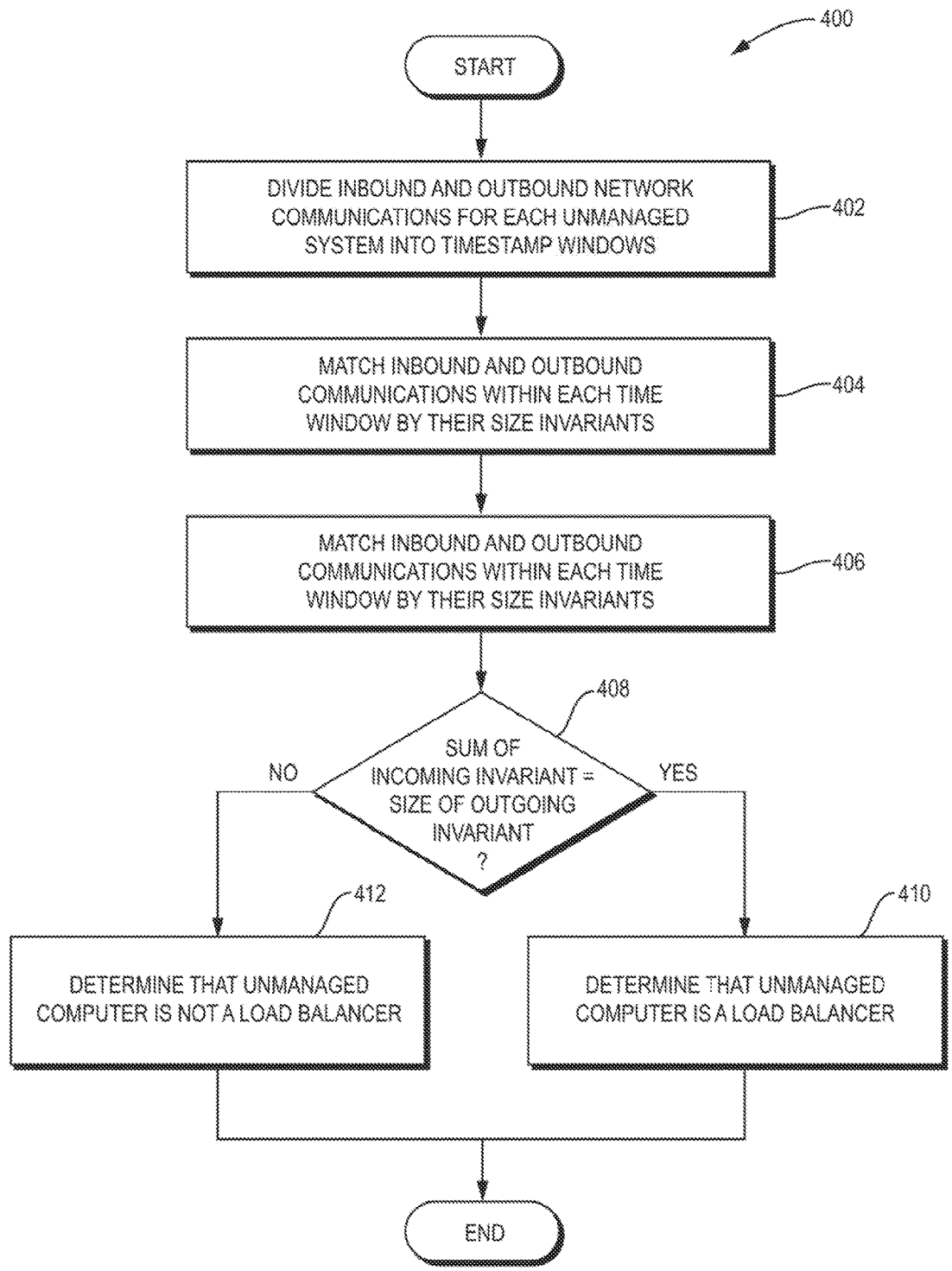
FIG. 4 is a flowchart of another method performed by the system of FIG. 2 according to one embodiment of the present invention.

Embodiments of the present invention may solve the problem created by this complication using the method 400 of FIG. 4. The load balancer detector 212 divides the inbound and outbound network communications for each unmanaged system (i.e., each system that is a candidate load balancer) into timestamp windows, where each window is defined by a start time and an end time (FIG. 4, operation 402). The load balancer detector 212 may then, within each of the timestamp windows, match inbound and outbound communications by their size (FIG. 4, operation 404). For example, the load balancer detector 212 may determine that a particular inbound and outbound communication within a particular timestamp window are matches for each other if they have the same size.

Once the inbound and outbound communications have been matched in this way, the load balancer detector 212 may calculate, for each timestamp window, an approximate fraction of the sizes of the inbound and outbound communications to the unmanaged system within that timestamp window, by counting the matched inbound communications and the matched outbound communications within that timestamp window (FIG. 4, operation 406) compared to the total number of inbound and outbound communications. These counts may also be summed across all time windows to create a single matching fraction.

The load balancer detector 212 may then determine whether the matched fraction satisfies a predetermined criterion (FIG. 4, operation 408). The load balancer detector 212 may make this determination in any of a variety of ways. In general, the load balancer detector 212 may use any of a variety of techniques to determine whether the matching fraction is sufficiently large (in an absolute or relative sense) to indicate that the unmanaged system is likely to be a load balancer. It may use them in isolation or in combination, possibly with differential weights. For example, the load balancer detector 212 may determine whether the fraction (or the average of the approximate sums) is greater than some minimum threshold value. As another example, the load balancer detector 212 may determine whether the matching fraction is significantly greater than the matching fraction for any other unmanaged system in the system 200. As yet another example, the load balancer detector 212 may determine whether the approximate sum is significantly larger than a baseline estimate of the plausible range of matching fractions that may occur by chance within a particular network, given the properties of the network. If the matching fraction is determined to satisfy the predetermined criterion or criteria, then the load balancer detector 212 determines that the unmanaged system is a load balancer (FIG. 4, operation 410). Otherwise, the load balancer detector 212 determines that the unmanaged system is not a load balancer (FIG. 4, operation 412). This method is based on the assumption that the number of matched communications going to and from a load balancer is likely to be much higher than for a non-load balancer.

The method 400 of FIG. 4 is useful when each load balancer has only a single IP address. Some load balancers, however, may have multiple IP addresses, such as an incoming IP address and an outgoing IP address. Often one IP address faces application servers and the other side faces external hosts which are serviced by those application servers. The problem posed by such multi-address load balancers is that there is no single unmanaged IP address that "balances" its inbound and outbound flow sizes. One embodiment of the present invention may identify such multi-address load balancers by using the method 400 of FIG. 4, but modified to identify pairs of unmanaged hosts that together satisfy the (approximate) size requirement described above in connection with the method 400 of FIG. 4. In this embodiment, the size requirement is applied to a pair of unmanaged hosts instead of to a single unmanaged host. The method 400 of FIG. 4 is applied, but instead the method 400 determines whether the size requirement holds for each possible unique pair of unmanaged hosts. Although this modified method may be used to successfully identify multi-address load balancers, the computational time required is O(n2) instead of O(n) as in the case of the method 400 of FIG. 4.

The modified method just described may be modified to execute more efficiently in a variety of ways by embodiments of the present invention. In general, such increased efficiency may be obtained by finding an approximation to the size requirement, by finding an intersection between sets of {timestamp, size} tuples, one of which is extracted from the inbound data of an unmanaged system, and the other of which is extracted from the outbound data for the same unmanaged system. For example, the MinHash data structure may be used to succinctly, quickly, and accurately approximate the size of the intersection between two sets, and may be applied to the data extracted for the unmanaged system to obtain an approximation of the size of the intersection between the two sets described above. The MinHash data structure estimates the size of the Jaccard similarity, which is defined as: $J(A,B)=|A \cap B|/|A \cup B|$.

Therefore, to approximate the balance between two unmanaged systems A and B, embodiments of the present invention may calculate the size of the intersection of the inbound MinHash of system A with the outbound MinHash of system B, and add the size of the intersection of the inbound MinHash of system B to the outbound MinHash of system A. Stated differently, in pseudocode:

aIn=minhash(hostA, "inbound")
aOut=minhash(hostA, "outbound")
bIn=minhash(hostB, "inbound")
bOut=minhash(hostB, "outbound")
minHashValue=jaccard(aIn, bOut)+jaccard(aOut, bIn)

Embodiments of the present invention may then examine all possible unique pairs of unmanaged hosts A and B, for which minHashValue (A,B)>0. This reduces the processing time by several orders of magnitude compared to the previously-described method, because fewer than one pair in a thousand has a non-zero minHashValue.

Embodiments of the present invention may automatically identify load balancers which are set up in various other ways. Some additional examples, without limitation, are as follows.

In some situations, multiple incoming requests may be combined by a load balancer into a single combined request, and the combined request may be sent to a single host server for processing. Although this affects the number of connections on the inbound side of the load balancer relative to the number of connections on the outbound side, the size should remain the same in the face of such combining. However, in this situation, it is no longer possible to find the size requirement in the data by matching timestamps and sizes directly, because one side's timestamp/size combination is represented on the other side by a set of timestamp/size pairs, with the condition that the sum of all of the sizes is the same on both sides. Embodiments of the present invention may find where the size requirement is satisfied in this situation using a more elaborate method than the method described above in connection with multi-address load balancers. Embodiments of the present invention may, however, still find the size requirement in the data by determining whether the sum of all of the sizes on the inbound side of the candidate load balancer is approximately the same as the sum of the sizes on the outbound side of the load balancer.

A load balancer which combines multiple incoming requests into a single outgoing request makes use of the MinHash method described above, however, much more difficult. Embodiments of the present invention may apply a modified version of the MinHash method described above to find the size requirement in the data for a load balancer that combines multiple inbound requests into one outbound request, by combining the (timestamp, size) tuples from all of the set members. This allows clean comparisons of the sizes.

As described above, some load balancers have one IP address on the inbound side and a different IP address on the outbound side. Furthermore, some load balancers have multiple IP addresses on the inbound side, multiple IP addresses on the outbound side, or multiple IP addresses on the inbound side and the outbound side. Embodiments of the present invention may find the size requirement in the data for such load balancers by considering sets of unmanaged hosts, rather than merely pairs of unmanaged hosts. If the maximum size of set under consideration is limited to K, then the computation complexity required to evaluate such sets increases from O(n2) to O(nk). In general, the techniques disclosed herein may be modified to evaluate such sets, and thereby to find the size requirement in the data even for load balancers which have multiple IP addresses on one or both sides. K may be selected to have any value.

One of the advantages of embodiments of the present invention is that it may be used to automatically identify systems (e.g., computers) on a network which are load balancers, without any a priori knowledge of which systems are load balancers, and based solely on observing network traffic among systems on the network. Embodiments of the present invention do not require load balancers to be managed in order to detect such load balancers. Furthermore, embodiments of the present invention do not even require all systems that are parties to communications to be managed systems in order to detect load balancers. Once load balancers have been identified automatically using embodiments of the present invention, embodiments of the present invention may connect communications between two systems across one or more such identified load balancers, thereby improving the efficiency of network communications.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The solution described in this patent discovers at least two types of load balancers. First, "proxy load balancers," where the connection from source system is terminated at the load balancer, then a new connection is initiated to the destination system. Second, "pass-through load balancers," which maintain end-to-end connectivity between source and destination using methods similar to network address translation (NAT). Amazon's network load balancer (NLB) is an example of a pass-through load balancer, as is Google's NLB. Amazon's elastic load balancer (ELB) and application load balancer (ALB) are both examples of proxy load balancers.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically, receive, transmit, and analyze communications on a digital communications network, and automatically identify computer systems that perform the function of load balancing on the network. Such features are applicable only within the context of networked communications, cannot be performed mentally and/or manually, and solve a problem that is necessarily rooted in network technology using a computer-automated solution.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
    receiving information about a plurality of incoming communications, over a network, to a computer;
    receiving information about a plurality of outgoing communications, over a network, from the computer;
    identifying, for each of the plurality of incoming communications, a corresponding invariant scalar quantity;
    identifying, for each of the plurality of outgoing communications, a corresponding invariant scalar quantity;
    determining whether a sum of the corresponding invariant scalar quantities for each of the plurality of incoming communications is equal to a sum of the corresponding invariant scalar quantities for each of the plurality of outgoing communications;
    if the sum of the corresponding invariant scalar quantities for each of the plurality of incoming communications is determined to be equal to the sum of the corresponding invariant scalar quantities for each of the plurality of outgoing communications, then determining that the computer is a load balancer; and
    otherwise, determining that the computer is not a load balancer;
    wherein the scalar invariant quantity corresponding to each of the plurality of incoming communications comprises a size of a payload of the incoming communication and the scalar invariant quantity corresponding to each of the plurality of outgoing communications comprises a size of a payload of the outgoing communication.

2. The method of claim 1, wherein the plurality of incoming communications comprises a plurality of messages transmitted by a plurality of computers, and wherein the step of receiving information about a plurality of incoming communications comprises receiving the plurality of messages at a computer that is not within the plurality of computers.

3. The method of claim 1, wherein the plurality of incoming communications comprises a plurality of messages transmitted by a plurality of computers, and wherein the step of receiving information about a plurality of incoming communications comprises receiving, at a computer that is not within the plurality of computers, communications from a management server containing information about the plurality of messages.

4. A system comprising at least one non-transitory computer-readable medium having computer program instructions stored thereon, the computer program instructions being executable by at least one computer processor to perform a method, the method comprising:
    receiving information about a plurality of incoming communications, over a network, to a computer;
    receiving information about a plurality of outgoing communications, over a network, from the computer;
    identifying, for each of the plurality of incoming communications, a corresponding invariant scalar quantity;
    identifying, for each of the plurality of outgoing communications, a corresponding invariant scalar quantity;

determining whether a sum of the corresponding invariant scalar quantities for each of the plurality of incoming communications is equal to a sum of the corresponding invariant scalar quantities for each of the plurality of outgoing communications;

if the sum of the corresponding invariant scalar quantities for each of the plurality of incoming communications is determined to be equal to the sum of the corresponding invariant scalar quantities for each of the plurality of outgoing communications, then determining that the computer is a load balancer; and otherwise, determining that the computer is not a load balancer;

wherein the scalar invariant quantity corresponding to each of the plurality of incoming communications comprises a size of a payload of the incoming communication and the scalar invariant quantity corresponding to each of the plurality of outgoing communications comprises a size of a payload of the outgoing communication.

5. The system of claim 4, wherein the plurality of incoming communications comprises a plurality of messages transmitted by a plurality of computers, and wherein the step of receiving information about a plurality of incoming communications comprises receiving the plurality of messages at a computer that is not within the plurality of computers.

6. The system of claim 4, wherein the plurality of incoming communications comprises a plurality of messages transmitted by a plurality of computers, and wherein the step of receiving information about a plurality of incoming communications comprises receiving, at a computer that is not within the plurality of computers, communications from a management server containing information about the plurality of messages.

* * * * *